United States Patent [19]
Wilkens

[11] 3,794,270
[45] Feb. 26, 1974

[54] METHOD AND APPARATUS FOR DETERMINING THE RELATIVE ATTITUDE AND POSITION OF TWO VEHICLES IN SPACE

[75] Inventor: Richard W. Wilkens, Largo, Fla.

[73] Assignee: Electronic Communications Inc., St. Petersburg, Fla.

[22] Filed: Mar. 21, 1972

[21] Appl. No.: 236,679

[52] U.S. Cl............................................. 244/1 SD
[51] Int. Cl............................................. B64g 1/00
[58] Field of Search ....... 244/1 R, 1 SS, 1 SD, 3.13, 244/77 SS; 73/1 D, 1 E, 178 R; 335/78, 81, 99, 101; 318/580–588; 235/150.2, 150.27; 114/144 R; 324/34 PS, 34 D; 33/355, 361, 363; 343/5–10, 112 CA, 112 S

[56] References Cited
UNITED STATES PATENTS 3,119,189   1/1964   Hyne.............................. 33/363 A
2,933,679   4/1960   Bray.............................. 33/355
3,033,305   5/1962   Harned et al.................... 318/587
3,277,431   10/1966  Kermode......................... 114/144 R Primary Examiner—Duane A. Reger
Assistant Examiner—Jesus D. Sotelo
Attorney, Agent, or Firm—Sandoe, Hopgood & Calimafde

[57] ABSTRACT

A magnetic member is located in each of two vehicles. At least one of these members and preferably both are pivotally movable in two perpendicular directions. Alternating magnetic fields that are in synchronization with each other are produced in the two magnetic members causing them to assume a colinear orientation. The attitude of a vehicle relative to an imaginary axis connecting the members can be determined by sensing the orientation of a movable magnetic member relative to the vehicle in which it is located. This system can be used to, for example, facilitate the docking of two vehicles in space.

6 Claims, 5 Drawing Figures 3,794,270

METHOD AND APPARATUS FOR DETERMINING THE RELATIVE ATTITUDE AND POSITION OF TWO VEHICLES IN SPACE

BACKGROUND OF THE INVENTION

This invention relates to a method and apparatus for determining the relative attitude and position of two vehicles, and more particularly to a method and apparatus which utilizes the mutual attraction of two magnetic members for this purpose.

By the use of conventional radar techniques, it is possible to determine, with a fairly high degree of accuracy, the relative position and, to some extent, the relative attitude of two vehicles such as aircraft or spacecraft when they are separated by a relatively large distance. However, when it is desired to make such a determination with a high degree of accuracy with respect to vehicles that are in close proximity to each other, previously known techniques which are of desirable simplicity are not able to accomplish this task in a totally satisfactory manner.

The problem of determining the relative attitude and position of two vehicles in close proximity to each other presents itself when it is desired to dock two spacecraft. In the past, this has been accomplished by bringing the vehicles together as closely as possible using conventional rendezvous radar and thereafter utilizing a partially manual technique. A boom, which can be manipulated by a mechanical linkage, is extended by a human operator from one vehicle and plugged into a socket in the other vehicle. Thus, the boom provides a common reference against which both vehicles can measure their attitude and make the necessary corrections. This is the technique which has been used in the Apollo program.

SUMMARY OF THE INVENTION

The present invention is a new and improved method and apparatus for accurately determining the relative attitude and position of two vehicles which is particularly useful for docking vehicles such as spacecraft.

The apparatus of the invention includes two magnetizable members one of which is located in each of two vehicles. Means are provided for supporting at least one of the magnetic members in a manner which permits pivotal movement in two perpendicular directions. Preferably, both magnetic members are supported in this way. The apparatus further incorporates means for sensing the orientation of the pivotally supported member relative to the vehicle in which it is located. The apparatus also includes means for producing an alternating magnetic field in one of the magnetic members, means for producing an alternating magnetic field in the other magnetic member, and means for synchronizing the alternation of the two fields. Becasue of the synchronization of the fields, the movable magnetic member is caused to assume a position in which its magnetic axis is coextensive with an imaginary axis connecting the two magnetic members. The output of the sensing means is indicative of the attitude relative to the imaginary axis of the vehicle containing the magnetic member.

The apparatus further comprises an oscillator and an amplifier arranged to supply power to each of the two magnetic members. The means for synchronizing the magnetic fields includes a radio transmitter and a radio receiver connected to the two oscillators, respectively.

The present invention also includes a method for determining the relative attitude and position of two vehicles. Like the apparatus of the invention, the method can be used to facilitate the docking of two vehicles, such as spacecraft. Succinctly stated, it comprises producing alternating magnetic fields that are in synchronization with each other in two magnetic members each of which is located in one of the two vehicles. This causes the magnetic members, if they are both movably supported, to assume a colinear orientation. The positions of the magnetic members relative to the vehicles in which they are located are then sensed, thereby determining the attitude of each vehicle with respect to an imaginary axis connecting the two magnetic members. It is possible to employ one movable magnetic member and one magnetic member that has a fixed position, but less information can be obtained in this way.

When a preferred embodiment of the method of the invention is employed to dock two spacecraft, the vehicles are first maneuvered into coplanar orbits using conventional rendezvous radar. Magnetic fields that are in synchronization with each other are induced in the two magnetic members, causing them to assume a colinear orientation along an imaginary axis. Then, the attitude of each magnetic member relative to the vehicle in which it is located can be determined. The attitude of the pursuit vehicle is adjusted until it is colinear with the imaginary axis, and the pursuit vehicle is moved in a translational manner into the orbit of the target vehicle. The pursuit vehicle is then moved relative to the target vehicle along the imaginary axis until the docking ports of the vehicle engage each other.

BRIEF DESCRIPTION OF THE DRAWINGS

An understanding of additional aspects of the invention can be gained from a consideration of the following detailed description of a representative embodiment, taken in conjunction with the appended drawings wherein.

DESCRIPTION OF THE PREFERRED EMBODIMENT

Figure 1:
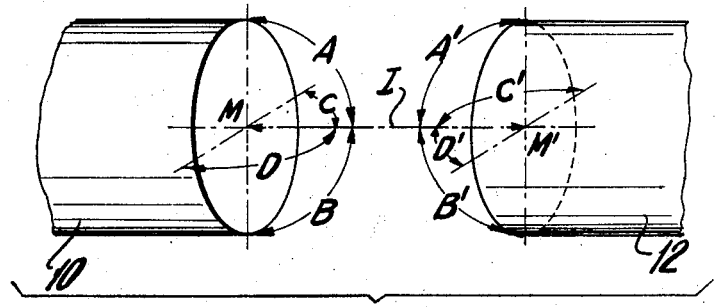
FIG. 1 is a schematic representation of two vehicles in close proximity to each other.

FIG. 1 illustrates two vehicles 10 and 12 which are in close proximity to each other. An analysis of their relative attitudes and positions can be made with respect to an imaginary axis I which connects a point M centrally located on the end of the vehicle 10 to a similar point M' centrally located on the opposing end of the vehicle 12. The end surface of each vehicle 10, 12 is perpendicular to its longitudinal axis. It is possible to define the attitude of either vehicle by measuring the angles that it makes with the imaginary axis I in two planes. The analysis is simplified if mutually perpendicular planes, which may be identified as horizontal and vertical, are chosen. In the vertical plane the end of vehicle 10 forms two supplementary angles A and B with the axis I. If the attitude of the vehicle 10 is such that its longitudinal axis is parallel to the axis I and if its position is such that its longitudinal axis is colinear with the axis I, then the angles A and B are each equal to 90°. A similar statement can be made with respect to the vehicle 12 and the supplementary angles A' and B' in the vertical plane. In the horizontal plane, the relationship between the end surface of the vehicle 10 and the axis I is defined by two supplementary angles C and D. If the longitudinal axis of the vehicle 10 is colinear with the imaginary axis I, the angles C and D will each be equal to 90°. If the vehicle 12 is aligned in a similar manner, the angles C' and D', which are in the same horizontal plane as the angles C and D, will also be equal to 90°.

Assuming that it is desired to determine the relative position and attitude of the vehicles 10 and 12, as would be the case if, for instance, they were two spacecraft to be docked together, an analysis similar to that set forth above could be made if the position of each vehicle could be determined with respect to their common imaginary axis I. As pointed out above, a connecting boom has been used for this purpose in the past. This invention permits each of the vehicles 10 and 12 to make the required determination with respect to the imaginary axis I without the use of a mechanical connection.

Figure 2:
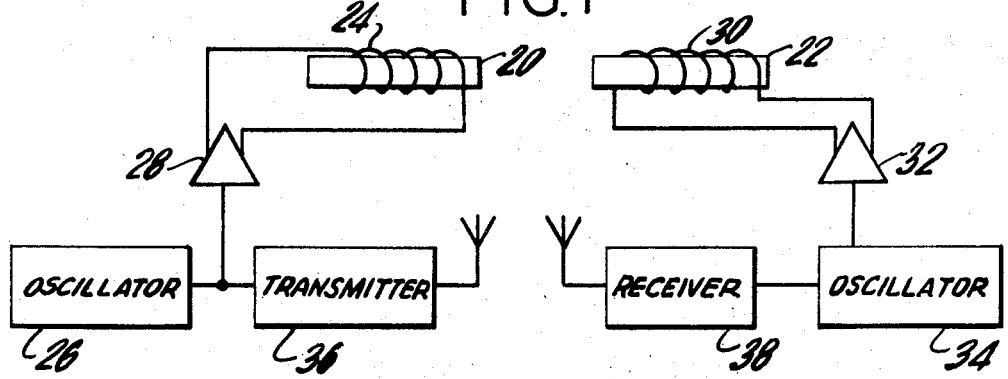
FIG. 2 is a schematic representation of an apparatus including two magnetic members which can be caused to assume a colinear orientation in accordance with the invention.

The invention employs two magnetic members 20 and 22 which are shown in FIG. 2. A coil 24 surrounds the magnetic member 20. This member 20 is referred to as a magnetic member because it is made of a magnetizable material and a magnetic field is induced therein when there is a change in the flow of current through the coil 24. Thus, the coil 24 forms a means for producing an alternating magnetic field in magnetic member 20. A means for supplying power to produce the alternating magnetic field in the member 20 comprises an oscillator 26 and an amplifier 28 to which the oscillator 26 is connected. In a similar manner, the magnetic member 22 is surrounded by a coil 30 which is in turn connected to an amplifier 32. An oscillator 34 provides the input to the amplifier 32.

A part of the output of the first oscillator 26 is supplied to a radio transmitter 36 whereby a signal which carries the frequency and phase information relative to the output of the oscillator 26 is communicated to a radio receiver 38. Preferably, this information is transmitted as a modulation of a carrier frequency. The demodulated signal from the receiver 38 is used to trigger the oscillator 34 in synchronization with the oscillator 26. Thus, the first oscillator 26 is the master oscillator and the second oscillator 34 is the slave oscillator. The oscillators 26 and 34, the transmitter 36 and the receiver 38 form a means for synchronizing the alternating fields of the magnetic members 20 and 22 to cause these members to attract each other and assume a colinear orientation along an imaginary axis connecting them. It is, of course, necessary that the synchronization of the fields produced in the magnetic members 20 and 22 be maintained. Alternating fields are used so that the magnetic members will not be caused to deviate from a colinear orientation by the attraction of the earth's magnetic field. The frequency of the fields should be chosen so that it is not harmonically related to that of other equipment present in the vehicles 10 and 12.

It is necessary to provide a means for supporting the magnetic members 20 and 22 in a manner which does not restrict their movement required if they are to assume a colinear orientation. This is accomplished if the magnetic members are capable of pivotal movement in two mutually perpendicular directions. Any movement of the members 20 and 22 can then be viewed as a combination of component movements in these two directions. Because the force of attraction between the two magnetic members 20 and 22 is relatively small, the frictional force inhibiting the movement of the members must be minimized. This can be accomplished by, for instance, supporting each magnetic member 20, 22 within a sphere which is placed inside of a slightly larger sphere. This permits a magnetic member thus supported to move pivotally about a central point when the inner sphere rotates with respect to the outer sphere. The inner sphere is separated from the outer sphere by a bearing fluid. Suspension of the inner sphere is maintained by continuous circulation of the fluid. Current can be supplied to the coils 24 and 30 by pigtail wiring without unacceptably restricting the movement of the inner sphere.

It is necessary to provide a means for sensing the orientation of the pivotally supported magnetic members 20 and 22 relative to the vehicles in which they are located. This can be accomplished by employing a transparent outer sphere and a transparent bearing fluid. Markings are placed on the outside of the inner sphere which are detected photoelectrically as it rotates to indicate the position of the magnetic member it contains.

Although in the preferred embodiment both magnetic members 20 and 22 are supported in the manner described above, a useful apparatus can be constructed wherein only one vehicle contains a movable magnetic member and the other vehicle contains a stationary magnetic member. This would provide information concerning the attitude of the vehicle carrying the movable member with respect to an imaginary axis connecting the two members. When performing a docking maneuver requiring axial alignment of both vehicles, this simlified device would provide only part of the information needed and supplementary information from other sources would be required. However, if a docking arrangement is employed in which axial alignment of the second vehicle as engagement of the docking ports occurred is not critical, the information concerning the relative attitude and position of the vehicles produced by a system in which only one magnetic member is movable would be sufficient.

Figure 3:
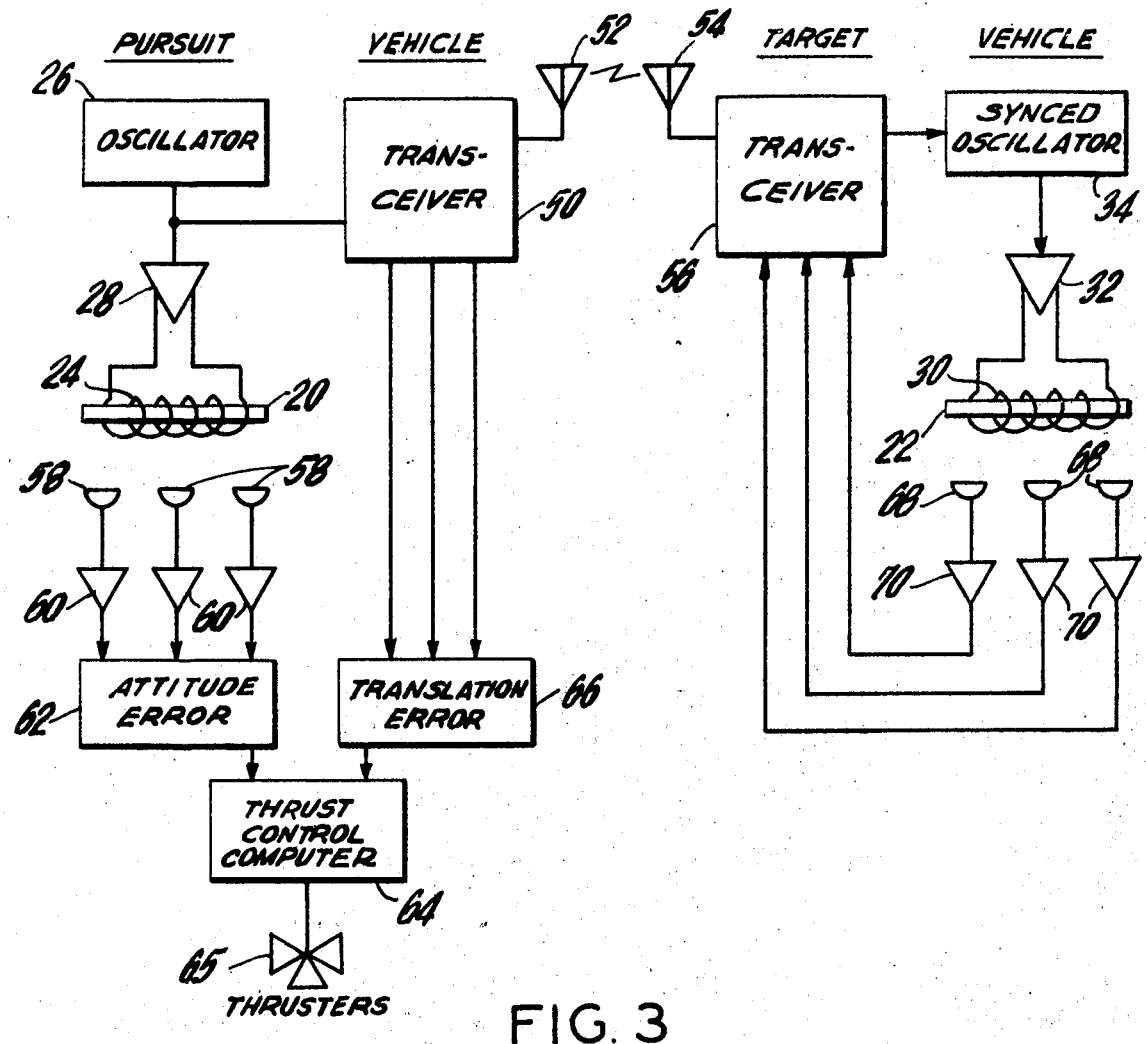
FIG. 3 is a schematic representation of a more comprehensive system, which incorporates the apparatus of FIG. 2, for facilitating the engagement of the docking ports of a pursuit vehicle and a target vehicle.

A more comprehensive schematic diagram of a preferred embodiment of the apparatus of this invention is shown in FIG. 3. Here the two vehicles to be brought into docking relationship are referred to as the pursuit vehicle and the target vehicle. In most instances, the pursuit vehicle is smaller and more maneuverable. Therefore, the target vehicle is maintained in a fixed orbital position while the circuit vehicle is maneuvered relative to it until docking is accomplished.

The reference numbers associated with the elements of the apparatus shown in FIG. 2 are carried forward into FIG. 3. The pursuit vehicle includes the first oscillator 26, the first amplifier 28, the first magnetic member 20 and the first coil 24. The radio transmitter 36 is, in FIG. 3, part of a transceiver 50 in the target vehicle. The transceiver 50 is connected to an antenna 52 by which it communicates through an antenna 54 to a transceiver 56 that includes the receiver 38 of FIG. 2. This provides a synchronized alternating magnetic field in the second magnetic member 22 produced by means of the second coil 30 using power supplied from the second oscillator 34 and the second amplifier 32.

The means for sensing the orientation of the pivotally supported magnetic member 20 relative to the pursuit vehicle in which it is located is represented by a plurality of photocells 58 each of which is connected to one of a plurality of amplifier 60. Although only three photocells and three amplifiers are illustrated in FIG. 3, more would be required in a complete operative system. The photocells 58 are responsive to markings that move with member 20.

The outputs of the amplifiers 60 are supplied to an attitude error computer 62 whereby the attitude of the pursuit vehicle relative to the magnetic member 20 can be determined in the same manner that it would be determined relative to the position of a connecting boom. This information is fed to a thrust control computer 64 which determines the force to be applied to the pursuit vehicle by the thrusters 65. The thrust control computer 64 receives additional information from a translation error computer 66. Information concerning the translation error originates from a plurality of photocells 69 which sense the position of the magnetic member 22 relative to the target vehicle. This information is amplified by a plurality of amplifiers 70, supplied to the transceiver 56, transmitted to a transceiver 50 in the pursuit vehicle, and then supplied by lines 72 to the translation error computer 66.

Figure 4:
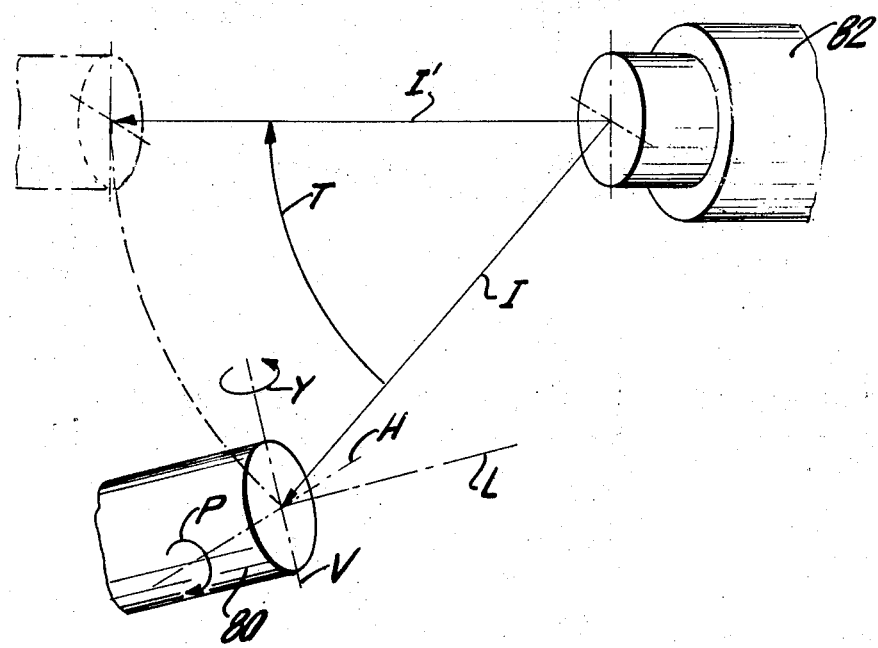
FIG. 4 is a schematic representation of a pursuit vehicle and a target vehicle which illustrates the movement of the pursuit vehicle in accordance with the invention.

The method of the invention, which may be practiced utilizing the apparatus of FIG. 3, is best understood with reference to FIG. 4. As the first step in bringing the docking ports of a first vehicle 80, called the pursuit vehicle, and second vehicle 82, called a target vehicle, into engagement with each other, the two vehicles are placed in coplanar orbits. This is most readily accomplished by moving the pursuit vehicle 80 into the orbit of the target vehicle 82 utilizing that craft's conventional control radar. Rendezvous radar is then used to bring the pursuit vehicle 80 within about 50 meters of the target vehicle 82. It is assumed that the longitudinal and docking axis of the target vehicle 82 is aligned with its direction of movement along its orbital path. If, however, this is found not to be the case, the target vehicle 82 should be aligned utilizing the craft's conventional attitude control system.

While the positional relationship between the vehicles 80 and 82 is maintained, the coils 24 and 30 are energized to produce synchronized alternating magnetic fields in the magnetic members 20 and 22. This causes the magnetic members 20 and 22 to assume a colinear orientation so that the magnetic axis of the members 20 and 22 provides a common reference for the two vehicles corresponding to an imaginary axis I connecting the vehicles 80 and 82. Next, the sensing means 58, 68 determines the position of the pursuit vehicle 80 relative to the imaginary axis I, and this information is fed to the attitude error computer 62 and then to the thrust control computer 66. The thrusters 65 of the pursuit vehicle 80 are thus employed to bring its longitudinal axis, which is coincident with its docking axis, into alignment with the imaginary axis I. Just as the movement of the magnetic members 20 and 22 may be conveniently analyzed as components of movement in two perpendicular directions, so the required movement of the target vehicle 80 to align itself with the imaginary axis I may be thought of as pitch maneuvers (rotation of the vehicle 80 about a horizontal axis H perpendicular to and passing through the vehicle's longitudinal axis L and represented by the arrow P) and yaw maneuvers (rotational movement of the vehicle 80 about a vertical axis V perpendicular to and passing through the vehicle's longitudinal axis L and indicated by the arrow Y).

After the pursuit vehicle 80 has been aligned with the imaginary axis I, it is caused to move through the plane containing the orbits of the two vehicles 80 and 82 until the vehicles 80 and 82 become co-orbital. This change in the position of the pursuit vehicle 80 from its original coplanar orbit into the orbit of the target vehicle 82 is referred to herein as a translational movement. It produces a change in the position of the vehicle in space as distinguished from a change in its attitude. The required translational movement may be determined by sensing the position of the target vehicle 82 with respect to the imaginary axis I. Since the magnetic member 22 is aligned with the axis I, the information needed to control the translation movement of the pursuit vehicle 80 is derived from the photocells 68. This information is transmitted from the target vehicle 82 to the pursuit vehicle 80 utilizing the transceivers 50 and 56. The required movement of the pursuit vehicle 82 is calculated by the translation error computer 66 and fed to the thrust control computer 64. Accordingly, a translational maneuver takes place as indicated by the arrow T in FIG. 4, until the pursuit vehicle 80 assumes the position shown in broken lines. When the longitudinal axis of both vehicles 80 and 92 are aligned along a single orbital path, the photocells 68 produce a zero error signal and the thrusters 65 are de-energized.

For purposes of explanation, the required movement of the pursuit vehicle 80 has been broken down into the step of adjusting its attitude with reference to the first magnetic member 20 and the step of adjusting in position by a translational movement with reference to the second magnetic member 22. It will be appreciated by those skilled in the art that these steps could be reversed in order or could be performed simultaneously. The necessity for a particular sequence in performing these steps should not be inferred from their recitation in that manner, although the sequence set forth here is believed to be preferable.

Figure 5:
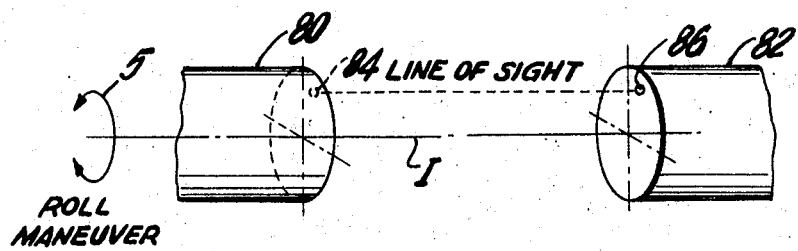
FIG. 5 is another schematic representation of two vehicles which are aligned on an imaginary axis.

Once the vehicles 80 and 82 have been aligned with respect to attitude and position as described above, only a roll adjustment need be made. This is best understood with reference to FIG. 5. Here, a marking 84 on the pursuit vehicle 80 must be aligned with another marking 86 on the target vehicle 82 before the docking ports of the vehicles can be engaged. This is readily accomplished using conventional optical instruments. The pursuit vehicle 80 can be caused to execute a roll maneuver, indicated by the arrow 5, until the line of sight connecting the marks 84 and 86 is aligned with the longitudinal axis of the pursuit vehicle 80 and with the connecting axis I. Then, the pursuit vehicle 80 is moved relative to the target vehicle 82 along the imaginary axis I until the docking ports of the vehicles engage each other.

The method and apparatus of this invention inherently incorporates a highly desirable hunt capability because the system becomes increasingly accurate as the distance between the magnetic members 20 and 22 decreases. Thus, the tolerance of the system becomes less and less until it finally reaches a minimum just before docking occurs.

It will be obvious to those skilled in the art that the above described embodiment is meant to be merely exemplary and that is is susceptible of modification and variation without departing from the spirit and scope of the invention. Therefore, the invention is not deemed to be limited except as defined by the appended claims.

I claim:

1. A method of determining the relative position of two vehicles in space comprising synchronously inducing magnetic fields of alternating polarity in movable magnetic members located in each of the vehicles whereby the magnetic members are caused to align themselves along a common magnetic axis and sensing the positions of the magnetic members relative to the vehicles in which they are located.

2. A method for bringing the docking ports of a pursuit vehicle and a target vehicle into engagement with each other in space comprising positioning the vehicles in coplanar orbits, producing alternating magnetic fields that are in synchronization with each other in magnetic members located in the vehicles to cause the members to align themselves along a common magnetic axis, determining the attitude of each vehicle relative to the axis sensing the positions of the magnetic members relative to the vehicles in which they are located, adjusting the attitude of the pursuit vehicle until its longitudinal axis is co-linear with the magnetic axis, causing a translational movement of the pursuit vehicle into the orbit of the target vehicle while maintaining the longitudinal axis of the pursuit vehicle parallel to said imaginary axis, and moving the pursuit vehicle relative to the target vehicle along said imaginary axis until the docking ports of the vehicles engage each other.

3. An apparatus for determining the attitude and position of two vehicles in space comprising two movable magnetizable members each located in one of the vehicles, means for sensing the position of a magnetic member relative to the vehicle in which it is located and producing an output corresponding thereto, and means for producing a synchronous magnetic field of alternative polarity in the magnetic members thereby causing them to align themselves along a common magnetic axis.

4. The apparatus of claim 3 wherein the means for producing synchronous magnetic fields includes a radio transmitter and a radio receiver.

5. The apparatus of claim 3 further comprising an oscillator and an amplifier arranged to supply power to each of the magnetic members wherein the means for synchronizing the two magnetic fields includes a radio transmitter connected to one of the oscillators and a radio receiver connected to the other oscillator.

6. The method of claim 2 further comprising determining the necessary translational movement of the pursuit vehicle by sensing the attitude of the target vehicle relative to the magnetic member located therein and transmitting a radio signal indicative thereof to the pursuit vehicle.

* * * * *